(12) United States Patent
Unger

(10) Patent No.: US 10,404,847 B1
(45) Date of Patent: Sep. 3, 2019

(54) APPARATUS, METHOD, AND COMPUTER READABLE MEDIUM FOR COMMUNICATING BETWEEN A USER AND A REMOTE SMARTPHONE

(71) Applicant: Amnon Unger, Givatayim (IL)

(72) Inventor: Amnon Unger, Givatayim (IL)

(73) Assignee: Amnon Unger, Givatayim (IL)

( * ) Notice: Subject to any disclaimer, the term of this patent is extended or adjusted under 35 U.S.C. 154(b) by 0 days.

(21) Appl. No.: 15/690,696

(22) Filed: Aug. 30, 2017

Related U.S. Application Data

(60) Provisional application No. 62/382,834, filed on Sep. 2, 2016.

(51) Int. Cl.
| | |
|---|---|
| *H04M 1/27* | (2006.01) |
| *H04M 1/60* | (2006.01) |
| *H04R 1/40* | (2006.01) |
| *G10L 15/22* | (2006.01) |
| *G10L 21/02* | (2013.01) |
| *H04M 1/725* | (2006.01) |

(52) U.S. Cl.
CPC .......... *H04M 1/7253* (2013.01); *G10L 15/22* (2013.01); *G10L 21/0205* (2013.01); *H04M 1/271* (2013.01); *H04M 1/6041* (2013.01); *G10L 2015/223* (2013.01); *H04R 1/406* (2013.01)

(58) Field of Classification Search
None
See application file for complete search history.

(56) References Cited

U.S. PATENT DOCUMENTS

| | | | |
|---|---|---|---|
| 6,449,496 B1* | 9/2002 | Beith | H04M 1/271 379/88.03 |
| 2004/0063475 A1* | 4/2004 | Weng | H04B 1/385 455/550.1 |
| 2005/0135297 A1* | 6/2005 | Katayama | H04M 1/6066 370/328 |

(Continued)

OTHER PUBLICATIONS

Panasonic kx-tg6582 manual, 2010 ftp://ftp.panasonic.com/telephone/om/kx-tg6582_en_om.pdf.*

*Primary Examiner* — Jianxun Yang
(74) *Attorney, Agent, or Firm* — Reches Patents

(57) ABSTRACT

A method, apparatus and computer readable medium. The method may include receiving at least one out of (i) a call notification from a smartphone that is conveyed over a short-range wireless communication link of an apparatus, and (ii) a user voice command for initiating a call by the smartphone, the user voice command is detected by a microphone array of the apparatus; generating, a connection establishment command that once received by the voice-controlled digital assistant will cause the voice-controlled digital assistant to establish a short-range wireless communication connection with the apparatus; outputting the connection establishment commands; performing a speech-based user recognition process by a speech recognition module of the apparatus; and following a successful speech-based user recognition process and a successful establishment of the short-range wireless communication connection with the voice-controlled digital assistant, participating in a call by exchanging audio conveying signals between the smartphone and the voice-controlled digital assistant.

24 Claims, 11 Drawing Sheets

(56) References Cited

U.S. PATENT DOCUMENTS

| | | | | |
|---|---|---|---|---|
| 2010/0268832 | A1* | 10/2010 | Lucas | H04L 65/1043 |
| | | | | 709/228 |
| 2010/0324890 | A1* | 12/2010 | Adeney | G10L 25/69 |
| | | | | 704/201 |
| 2015/0154976 | A1* | 6/2015 | Mutagi | H04L 12/281 |
| | | | | 704/275 |

* cited by examiner

| Use Case: Incoming call to User1 - | Amazon Echo | | | |
|---|---|---|---|---|
| # | Action | From | Through | To | Remarks |
| 1 | Smartphone1 receives call for User1 | | | S1 | |
| 2 | Send alert to slave Aggregators | S1 | | A1b1 | |
| | | S1 | | A2b1 | |
| 3 | Connect Echo with Aggregator (Bluetooth) | A1b1 | A1c, A1t | A1s | "Alexa, connect with Aggregator" |
| | | A2b1 | A2c, A2t | A2s | |
| | | E1 | | A1b2 | Echo connects |
| | | E2 | | A2b2 | |
| 4 | Announce user1 name | A1c | A1t, A1b2 | E1 | "User1 (actual user1 name) phone is ringing" |
| | | A2c | A2t, A2b2 | E2 | |
| 5a | No user answer | A1c | A1t | A1s | "Alexa, disconnect Aggregator" |
| | | A2c | A2t | A2s | |
| 5b | User1, located near Aggregator1 answers | A1m | A1f, A1r, A1c, A1b1 | S1 | "Aggregator, connect phone". Aggregator identifies user and keywords. Smartphone1 is given an answer command |
| | | A2c | A2t | A2s | "Alexa, disconnect Aggregator" |
| | | E2 | | A2b2 | Echo disconnects |
| 6 | Call in progress | S1 | A1b1, A1b2 | E1 | Calling party voice trough Echo1 |
| | | U1 | A1m, A1f, A1b1 | S1 | User1 voice through Aggregator |
| 7 | Call end, initiated by caller | S1 | A1b1, A1c, A1t | A1s | "Alexa, disconnect Aggregator" |
| | | E1 | | A1b2 | Echo disconnects |
| | Call end, initiated by User1 | U1 | A1m, A1f, A1r | A1c | "Aggregator disconnect". Keywords identified |
| | | A1c | A1b1 | S1 | End call |
| | | A1c | A1t | A1s | "Alexa, disconnect Aggregator" |
| | | E1 | | A1b2 | Echo disconnects |

| Use Case: Incoming call to User1 - | Bluetooth speaker | | | Variations from Echo process |
|---|---|---|---|---|
| # | Action | From | Through | To | Remarks |
| 3 | Connect speaker with Aggregator | A1b1 | A1c, A1b2 | E1 | E1 here is Speaker1 |
| | | A2b1 | A2c, A2b2 | E2 | E2 here is Speaker2 |
| 5a | No user answer | A1c | A1b2 | E1 | disconnect link |
| | | A2c | A2b2 | E2 | |
| 5b | | | | | disconnect process as in 5a above |
| 7 | | | | | disconnect process as in 5a above |

| Use Case - User1 initiates call | | Amazon Echo | | |
|---|---|---|---|---|
| # | Action | From | Through | To | Remarks |
| 1 | User1 initiates a call | U1 | A1m, A1f | A1r | "Aggregator, call Jo" |
| | | A1r | | A1c | User and "Call" keyword are identified |
| 2 | Connect smartphone with Aggregator | A1c | A1b1 | S1 | Call is initiated on S1 which is the identified user's smartphone |
| | Connect Echo with Aggregator (Bluetooth) | A1c | A1t | A1s | "Alexa, connect with Aggregator" |
| | | E1 | | A1b2 | Echo connects |
| 3 | Call in progress | S1 | A1b1, A1b2 | E1 | Called party voice trough Echo1 |
| | | U1 | A1m, A1f, A1b1 | S1 | User1 voice through Aggregator |
| 4a | Call end, initiated by called party | S1 | A1b1, A1c, A1t | A1s | "Alexa, disconnect Aggregator" |
| | | E1 | | A1b2 | Echo disconnects |
| 4b | Call end, initiated by User1 | U1 | A1m, A1f, A1r | A1c | "Aggregator disconnect". Keywords |
| | | A1c | A1b1 | S1 | End call |
| | | A1c | A1t | A1s | "Alexa, disconnect Aggregator" |
| | | E1 | | A1b2 | Disconnect link |

| Use Case: Incoming call to User1 + Call waiting | | | | Additions to Echo process | |
|---|---|---|---|---|---|
| 3a | | | | | Call in progress. Same as 3 above |
| 3b | Smartphone 1 receives a call for User1 | | | S1 | Call waiting |
| | | S1 | A1b1, A1c, A1b2 | E1 | Call wait signal is added to audio sent to E1 |
| | User1 accepts new call | U1 | A1m, A1f, A1r | A1c | User says "Aggregator, answer call" |
| | | A1c | A1b1 | S1 | Smartphone1 is notified to switch calls |

| Use Case: Incoming call to User1 - | | Bluetooth speaker | | Variations from Echo process | |
|---|---|---|---|---|---|
| 2 | Connect speaker with Aggregator | A1c | A1b2 | E1 | E1 here is Speaker1 |
| 4 | Call ends - interaction with speaker | A1c | A1b2 | E1 | disconnect link |

| Use Case -TTS (Voice messages of received SMS, Whatsapp, etc.) | | | Amzon Echo | |
|---|---|---|---|---|
| # Action | From | Through | To | Remarks |
| 1 User1 instructs Aggregator to play all notifications from now on | U1 | A1m, A1f, A1r | A1c | "Aggregator, play notifications". User1 is identified by A1. |
| 2 Aggregator instructs S1 to play notifications through its dedicated app (succ as Bazz or ReadItToMe) | A1c | A1b1 | S1 | |
| 3 Notification received by smartphone | S1 | A1b1 | A1c | |
| Connect Echo with Aggregator (Bluetooth) | A1c | A1t | A1s | "Alexa, connect with Aggregator" |
| | E1 | | A1b2 | Echo connects |
| 4 Message is played | A1c | A1b2 | E1 | |
| 5 Connection with Alexa ends | A1c | A1t | A1s | "Alexa, disconnect Aggregator" |
| | E1 | | A1b2 | Echo disconnects |
| | | | | |
| Use Case: Incomming call to User1 - | | Bluetooth speaker | Variations from Echo process | |
| | | | | |
| 3 Notification received by smartphone | S1 | A1b1 | A1c | |
| Send notification to speaker | A1c | A1b2 | E1 | Here, E1 is the speaker |

| Use Case - Synchronizing several devices | | | Aggregators sync | |
|---|---|---|---|---|
| # Action | From | Through | To | Remarks |
| 1 Syncing several Aggregator devices that operate in the same household is required in several scenarios | | | | |
| 2 Syncing will be based on W-F- communication | | | | |
| 3a Transfer user's calls to a specific Aggregator | U1 | A1m, A1f | A1r | "Aggregator, transfer here my call". User and keyword are identified |
| | A1r | A1c, A1w, A2w | A2c | Other Aggregator devices are ordered not to handle User1 calls |
| 3b Mute all Aggregators in the household | U1 | A1m, A1f | A1r | "Aggregator, mute calls everywhere". User and keyword are identified. All Aggregator devices no longer notify of incoming calls |
| | A1r | A1c, A1w, A2w | A2c | Other Aggregator devices are ordered not to handle User1 calls |
| 4 User voice is detected by more than one device | U1 | A1m, A1f, A1c, A1w, A2w | A2c | Each time User says the keyword "Aggregator" reception strength is shared by all Aggregator devices and only the strongest one responds |

Use Case - User1 call from his smartphone to verbally command Echo

| # | Action | From | Through | To | Remarks |
|---|---|---|---|---|---|
| 1 | User1 calls his home Echo | U1 | S1, Internet, A1w | A1c | 1. User is located remotely from home (e.g. in his car) 2. Call is initiated by pressing a pre-configured key in the user's smartphone Aggregator application (directly connects with his Echo's specific ip) |
| 2 | User1 identity verification | U1 | S1, Internet, A1w | A1r | User says "Connect with Echo". Keywords are recognized. User identity is verified. Call starts only if user identity was verified |
| 3 | Connect Echo with Aggregator | A1c | A1t | A1s | "Alexa, connect with Aggregator" |
|   |   | E1 |   | A1b2 | Echo connects |
| 4 | Call in progress | U1 | S1, Internet, A1w, A1s | E1 | User voice is played to Echo |
|   |   | E1 | A1m, A1f, A1w, Internet, S1 | U1 | Echo response is played to User |
| 5 | User1 disconnects | U1 | S1, Internet, A1w, A1c | A1s | "Alexa, disconnect Aggregator" |
|   |   | E1 |   | A1b2 | Disconnect link |
|   |   | S1 |   | A1 | Disconnect link |

APPARATUS, METHOD, AND COMPUTER READABLE MEDIUM FOR COMMUNICATING BETWEEN A USER AND A REMOTE SMARTPHONE

CROSS REFERENCE

This application claims priority from U.S. provisional patent 62/382,834 filing date Sep. 2, 2016 which is incorporated herein by reference.

BACKGROUND

Smartphone ownership rates have skyrocketed in recent years. A 2015 ITU survey indicates that "by end 2015, there are more than 7 billion mobile cellular subscriptions corresponding to a penetration of 97%, up from 738 million in 2000". Smartphones usage by each and every household or office member became the norm. People are expected to be constantly available for verbal or textual communication and keep their phones nearby, almost 24/7. This new "social norm" is neither convenient not healthy (radiations issues).

Another growing trend is the use of digital assistants such as Amazon Echo and Google Home. These devices include high quality audio systems that are utilized for answering queries, playing music, launching cloud based applications and controlling IoT devices. Their operational success depends on microphone and speaker quality and web based processing. As such, they introduce high quality speakers into households and offices. Some of these devices do not include functionalities that offer smartphone calls or smartphone notifications.

SUMMARY

There may be provided a method, may include receiving at least one out of (i) a call notification from a smartphone that may be conveyed over a short-range wireless communication link of an apparatus, and (ii) a user voice command for initiating a call by the smartphone, the user voice command may be detected by a microphone array of the apparatus; generating, a connection establishment command that once received by the voice-controlled digital assistant will cause the voice-controlled digital assistant to establish a short-range wireless communication connection with the apparatus; outputting the connection establishment commands; performing a speech-based user recognition process by a speech recognition module of the apparatus; and following a successful speech-based user recognition process and a successful establishment of the short-range wireless communication connection with the voice-controlled digital assistant, participating in a call by exchanging audio conveying signals between the smartphone and the voice-controlled digital assistant.

There may be provided an apparatus that may include a short-range communication module; a microphone array that may include one or more microphones; a speaker; a far-field module that may be configured to process audio signals received by the microphone array to provide processed audio signals of improved far field speech intelligibility; a speech recognition module that may be configured to perform a speech-based user recognition process and a keyword detection process based on processed audio signals received by the microphone array; and a controller; wherein the short-range wireless communication module may be for short-range wireless communicating with the smartphone and the voice-controlled digital assistant, the short-range wireless communicating may include exchanging, following a successful speech-based user recognition, audio conveying signals between the smartphone and the voice-controlled digital assistant.

The apparatus may include a text to speech module.

The apparatus wherein the text to speech module may be configured to generate a voice command for controlling the voice-controlled digital assistant; wherein the text to speech module may be configured to generate the voice command in response to at least one out (i) a notification from a smartphone, the notification may be received by the short-range communication module, and (ii) a user voice command from a user, the user voice command may be received by the microphone array; wherein either one of the speaker and the text to speech module may be configured to output the voice command.

The short-range wireless communication module may be configured to (i) receive, from the smartphone, a call reception notification regarding of a reception of a call by the smartphone; and (ii) send a call reception indication to the controller; wherein the text to speech module may be configured to generate, in response to the call reception indication, a connection establishment command that once received by the voice-controlled digital assistant will cause the voice-controlled digital assistant to establish a short-range wireless communication connection with the apparatus.

The short-range wireless communication module may be configured to generate, in response to an establishment of the short-range wireless communication connection with the voice-controlled digital assistant, a call reception message that once received by the voice-controlled digital assistant will cause the voice-controlled digital assistant to output an audio call reception message indicative of the reception of the call by the smartphone; and wherein the short-range wireless communication module may be configured to short-range wirelessly send the call reception message to the voice-controlled digital assistant.

The call reception message may include an identification of a user associated with the smartphone.

The speech recognition module may be configured to perform the speech-based user recognition on processed speech signals detected by the microphone array within a time window that starts at the short-range wirelessly sending of the call reception message.

The text to speech module may be configured to generate a disconnect message when the apparatus fails to detect a response from the user during the time window; wherein the disconnect message once received by the voice-controlled digital assistant will cause the voice-controlled digital assistant to terminate short-range wireless connection with the apparatus.

The speech recognition module may be configured to detect a user generated request to terminate the call; and wherein the text to speech module may be configured to generate a disconnect message in response to the detection of the user generated request to terminate the call; wherein the disconnect message once received by the voice-controlled digital assistant will cause the voice-controlled digital assistant to terminate short-range wireless connection with the apparatus.

The apparatus may be configured to detect a caller generated request to terminate the call; and wherein the text to speech module may be configured to generate a disconnect message in response to the detection of the caller generated request to terminate the call; wherein the disconnect message once received by the voice-controlled digital assistant will cause the voice-controlled digital assistant to terminate short-range wireless connection with the apparatus.

The short-range wireless communication module may be configured to receive a waiting call indication from the smartphone; wherein the text to speech module may be configured to generate, in response to the waiting call indication, a call reception message that once received by the voice-controlled digital assistant will cause the voice-controlled digital assistant to output an audio waiting call message indicative of the reception of a waiting call by the smartphone.

The apparatus may be configured to detect, a request from the user to transfer a call to another apparatus; short-range wirelessly communicate the request to the other apparatus and instruct the apparatus to disconnect.

The apparatus may be configured to detect a request from the user to mute calls; and prevent sending notifications about incoming calls, following the request from the user.

The apparatus may be configured participate in a selection process for selecting an apparatus, out of a group of apparatus, that will respond to a user command; wherein the group may include the apparatus and at least one other apparatus.

The selection process may be based on strength of reception of the user command by the members of the group.

The short-range wireless communication module may be configured to short-range wirelessly receive a request from the smartphone to establish a wireless connection over the Internet with the apparatus; to accept the request; detect a request of the user, conveyed over the Internet, to establish a connection with the voice-controlled digital assistant; generate, in response to the request of the user, a connection establishment command that once received by the voice-controlled digital assistant will cause the voice-controlled digital assistant to establish a short-range wireless communication connection with the apparatus; in response to an establishment of the short-range wireless communication connection with the voice-controlled digital assistant, to wirelessly relay audio conveying signals between the smartphone and the voice-controlled digital assistant.

The apparatus may be configured to short-range wireless communicate with the smartphone using a first short-range wireless communication protocol and to short-range wireless communicate with the voice-controlled digital assistant using a second short-range wireless communication protocol, wherein the first and second short-range wireless communication protocols may be associated with different power consumption of the apparatus.

The first and second short-range wireless communication protocols may be different classes of BLUETOOTH.

The apparatus may be configured to short-range wireless communicate using at least one out of BLUETOOTH and WI-FI.

The apparatus may include a power supply unit for supplying power to the voice-controlled digital assistant.

The apparatus may include a power supply unit for wirelessly supplying power to the voice-controlled digital assistant.

The apparatus may include a structural element for supporting the voice-controlled digital assistant.

The structural element may be a cradle having an upper part that may be shaped and sized to support the voice-controlled digital assistant.

There may be provided a non-transitory computer readable medium that stores instructions that once executed by an apparatus will cause the apparatus to receive at least one out of (i) a call notification from a smartphone that may be conveyed over a short-range wireless communication link of an apparatus, and (ii) a user voice command for initiating a call by the smartphone, the user voice command may be detected by a microphone array of the apparatus; generate, a connection establishment command that once received by the voice-controlled digital assistant will cause the voice-controlled digital assistant to establish a short-range wireless communication connection with the apparatus; output the connection establishment commands; perform a speech-based user recognition process by a speech recognition module of the apparatus; and following a successful speech-based user recognition process and a successful establishment of the short-range wireless communication connection with the voice-controlled digital assistant, participate in a call by exchanging audio conveying signals between the smartphone and the voice-controlled digital assistant.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 illustrates an example of data and control flows when one of the smartphones receives a call;

FIG. 4 illustrates an example of data and control flows when one of the users initiates a call;

FIG. 5 illustrates an example of data and control flows when one of the users instructs the apparatus to play notifications from his smartphone;

FIG. 6 illustrates an example of synchronizing several apparatuses located in the same household or office;

FIG. 7 illustrates an example of data and control flows when a user connects to an apparatus over the internet in order to remotely control a third party digital assistant;

Figure 1:
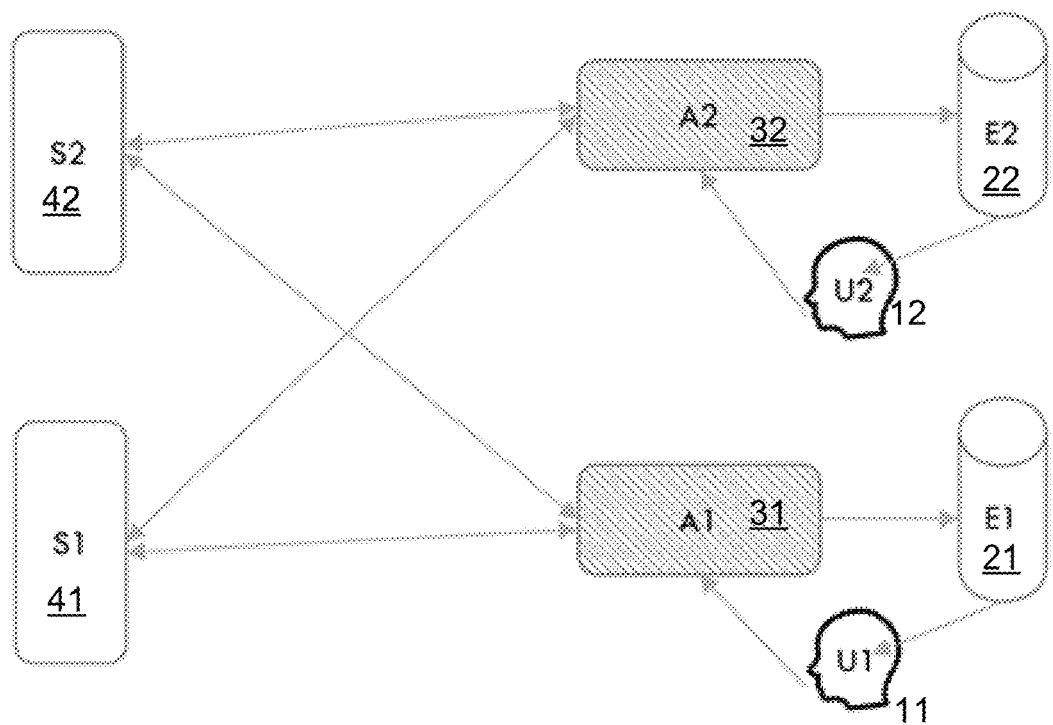
FIG. 1 illustrates an example of two apparatuses and their environment.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

Any reference to an apparatus should be applied, mutatis mutandis to a method that is executed by an apparatus and/or to a non-transitory computer readable medium that stores instructions that once executed by the apparatus will cause the apparatus to execute the method.

Any reference to method should be applied, mutatis mutandis to a apparatus that is configured to execute the method and/or to a non-transitory computer readable medium that stores instructions that once executed by the apparatus will cause the apparatus to execute the method.

Any reference to a non-transitory computer readable medium should be applied, mutatis mutandis to a method that is executed by an apparatus and/or an apparatus that is configured to execute the instructions stored in the non-transitory computer readable medium.

The apparatus, method and computer readable medium utilize on the one hand, the new social norm which requires people to be constantly available for smartphone communications, and on the other hand, quality speakers' penetration and availability in households and offices.

The apparatus, method and computer readable medium provide on the one hand, aggregation and hands-free control of smartphone communications and on the other hand utilization of existing digital assistants to play smartphone audio.

An apparatus, method and computer readable medium for hands free control and aggregation of multiple smartphones.

Controlled smartphones are located anywhere within the apparatus wireless coverage. Users are located in a perimeter around the apparatus defined by its far-field microphone coverage. Users are vocally alerted to smartphone activities and are able to vocally direct relevant communication to and from the apparatus.

User's voice is captured and processed by the apparatus. Voice is analyzed and keywords that control its operation are identified. User's identity is biometrically verified in order to control apparatus access. Smartphone audio is played on an external speaker, either a dedicated speaker or a speaker which is part of $3^{rd}$ party devices such as digital assistants. Speaker operation is controlled by either voice or data commands generated by the apparatus.

In another embodiment, a user verbally controls a third party digital assistant while he is located outside the apparatus wireless coverage. The user connects with the apparatus over the internet by using a smartphone application. The apparatus verifies user identity and then serves as a two-way transmitter, relying user voice to the digital assistant and digital assistant's response to the user.

The apparatus may utilize existing household or office speaker infrastructure to play smartphone audio.

The apparatus may monitor smartphones' activities in an area that covers typical house or office surroundings. Therefore, the smartphone can be located at a significant distance from the apparatus so that the user has no need to carry it along while at home or at the office.

When a phone call is received, the apparatus notifies potential users in its vicinity (for example—using an external speaker or a third party digital assistant such as a voice controlled digital assistant) that a call from a specific smartphone has been initiated. The apparatus may add other relevant data, such as caller identity.

When a user asks for the call to be forwarded to him, the apparatus employs voice biometrics to verify user ownership of the specific smartphone. If ownership is verified the call is forwarded from the smartphone to the apparatus. User voice is also analyzed to identify keywords that control apparatus operation.

During the call user voice is captured by the apparatus's far field microphone system and is sent to the smartphone. Smartphone audio is sent by the apparatus to an adjacent speaker. If the speaker is part of a voice controlled digital assistant then the apparatus issues the set of vocal commands required for its operation.

The voice controlled digital assistant may be controlled only by voice commands but may also be controlled in other manners—for example by voice commands and by using information conveying links, by infrared, by laser, and the like. For example—the voice controlled digital assistant may be first voice controlled to establish a communication link with the apparatus but after the connection was established—other commands may be sent by voice (audio) or by any other manner.

Playing of smartphone notifications, such as SMS or WhatsApp, follows a similar pattern.

An outgoing call initiated by the user follows a similar pattern.

In another embodiment, a user verbally controls over the internet a third party digital assistant while he is located outside the apparatus wireless coverage. The apparatus verifies user identity and serves as a two-way transmitter, relying user voice to the digital assistant and digital assistant's response to the user. The user may, for example, turn on or off the lights and/or air condition.

The apparatus is configured to aggregate smartphones' communications to a specific physical locality. The apparatus may also be referred to as an aggregator. The smartphone communication includes audio data and control signals.

The following example refers to several communication protocols such as class 1 BLUETOOTH™, class 2 BLUETOOTH™ and WI-FI™. These are merely examples of short-range wireless communication protocols.

The apparatus may communicate with a voice-controlled digital assistant. The voice-controlled digital assistant may be Alexa™ of Amazon Inc., or a compatible device. The voice-controlled digital assistant may establish short-range wireless communication sessions after receiving an (for example—audio) connection establishment command. After the connection is established the apparatus may send (over a short-range wireless connection) audio conveying signals to the voice-controlled digital assistant that may be played by the voice-controlled digital assistant. The connection establishment command may be provided in other manners—such as over a short-range wireless connection.

The short-range wireless connection conveys electromagnetic signals but is may not be an audio channel. Audio conveying signals (that once fed to a speaker may cause the speaker to output audio) may be conveyed over the short-range wireless connection.

A probable scenario could constitute a household where occupants' smartphones are located near the entrance to the house and aggregators are in the living room, bedroom, and bathroom. A user in the bathroom can be alerted to an incoming call or notification and then control his smartphone and execute a call hands free.

Smartphones are located anywhere within a perimeter around the apparatus defined by the apparatus's Bluetooth or Wi-Fi range. Users are in a perimeter around the apparatus defined by the apparatus's far-field microphone coverage.

User's voice is captured and processed by the apparatus. Voice is analyzed to identify keywords that control its operation. User's identity is verified to control apparatus access.

Sound is played on an external speaker, either a dedicated speaker or a speaker which is part of a $3^{rd}$ party device (e.g. smart digital assistant). $3^{rd}$ party devices are controlled by either voice or data commands generated by the aggregator.

FIG. 1 illustrates a typical scenario where two smartphones (S1 41 and S2 42) that are located within the effective perimeter of two aggregators (A1 31 and A2 32) communicate with the aggregators to exchange data and voice. Aggregators pick up and process voice of User1 (U1) 11 or User2 (U2) 12, and control the relevant elements as needed. Audio is played through speakers (E1 21, E2 22) which can either be standalone or part of a voice-controlled digital assistant.

The number of users, smartphones, voice-controlled digital assistants and standalone speakers (such as BLUETOOTH speakers) may be one, two or exceed two.

Figure 2:
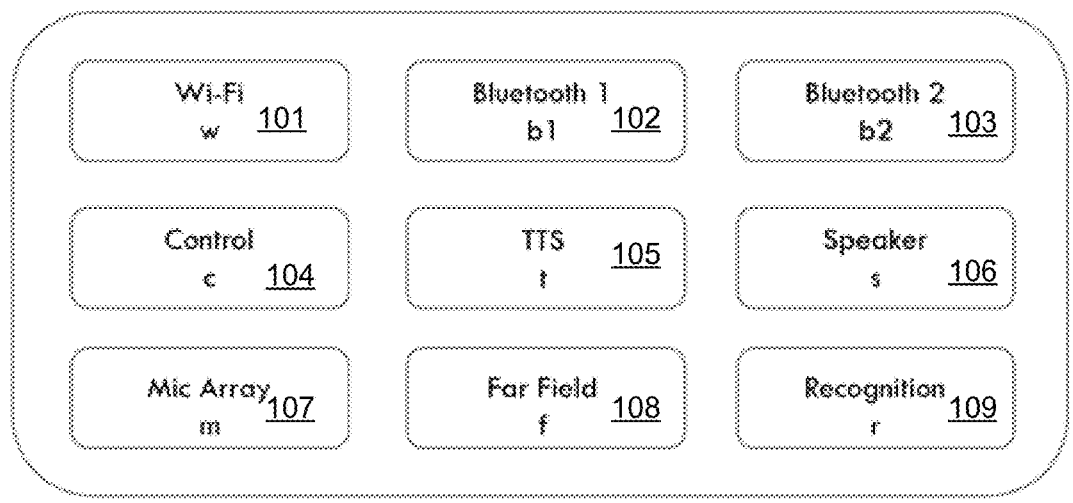
FIG. 2 illustrates an example of an apparatus.

FIG. 2 illustrates an apparatus 31.

In FIG. 2 it is assumed that the apparatus includes a short-range wireless communication module that uses class 1 BLUETOOTH ("bluetooth1") 102 protocol to communicate with smartphones, a short-range wireless communication module that uses class 2 BLUETOOTH ("bluetooth2") 103 protocol to communicate with the voice-controlled digital assistant, and a short-range wireless communication module that uses Wi-Fi ("Wi-Fi") module 101 that manages Wi-Fi communications into and out of the apparatus.

These are merely examples of communication protocols. Other communication protocols may be used.

Controller ("control") 104 may include hardware, software and computer code that control aggregator's operation.

Text to speech module ("TTS") 105—a Text to Speech converter that enables verbal control of third party systems such as voice-controlled digital assistant.

TTS 105 may generate audio messages to be played by the external speaker. An example: when announcing "Amnon's smartphone is ringing", the audio of this message is generated by the TTS.

Speaker 106—this is a low power speaker that issues voice commands to an adjacent $3^{rd}$ party system to control its operation. The speaker 106 may be a part of TTS 105. Alternatively the TTS may use speaker 106 for outputting voice commands.

Microphone array ("Mic Array") 107 may include one or more microphones—and may be arranged to enhance user's voice reception and filter out other voices and noise.

Far filed module ("Far Field") 108—this is a combination of hardware, software and computer code that process microphone array output to optimize far-filed speech intelligibility, keyword detection and user authentication.

Speech recognition module ("recognition") 109—this module is a combination of hardware, software and computer code that performs speech based user verification.

In FIGS. 3-7 there are shown steps executed by the apparatus and/or smartphone. Steps that involve modules of the apparatus A1 are marked by the relevant module:

a. A1$w$=Wi-Fi module 101.
b. A1$b1$=bluetooth1 module 102.
c. A1$b2$=bluetooth2 module 103.
d. A1$c$=control module 104.
e. A1$t$=TTS module 105.
f. A1$s$=speaker 106.
g. A1$m$=Microphone Array 107.
h. A1$f$=Far Field module 108.
i. A1$r$=speech recognition module 109.

FIG. 3 illustrates an incoming call use case 200.

FIG. 3 details information (data and audio) flow when a call is received by a smartphone (in this example it is Smartphone1—S1) which belongs to User1 (U1). S1 is located inside the wireless coverage perimeter of two aggregators, Aggregator1 and Aggregator2 (A1 & A2). Each aggregator is linked to a different speaker, E1 and E2 (in this example both speakers are part of Amazon's Echo digital assistant Information flow begins when the phone sends a "Received Call" alert to both Aggregators.

Both apparatuses issue verbal commands to the adjacent Echo by using the aggregator's internal speaker. The commands activate Echo's Bluetooth connection with Aggregator.

Both Aggregator apparatuses send a voice message to announce that User1 phone is ringing. The message is played as is by Echo's speaker.

When User 1 is not located inside the microphone operational perimeter of A1 or A2, neither Aggregator receives verbal acknowledgment from User1. Aggregator issues Verbal command to the adjacent Echo to disconnect the Bluetooth link previously established User1 answers by saying "Aggregator, connect phone". Aggregator identifies these keywords and verifies User1 identity. Only then an audio connection is established with S1. The other Aggregator disconnects itself from Echo (as described in the previous paragraph)

A call is conducted. User1's voice is captured by Aggregator1's microphone array. Caller voice is played through Amazon Echo.

User1 can initiate call end by issuing the verbal command "Aggregator disconnect". Alternatively call end is initiated by the caller. In either case, Echo's link is disconnected once Aggregator issues the appropriate verbal command.

The following Use Case details variations from the previous process when the speaker is not part of an "Echo like" system (verbally controlled $3^{rd}$ party system). In this example, a dedicated Bluetooth controlled speaker is used. The variations result from a data based control interface which replaces Echo's verbal control interface.

Outgoing call use case is shown in FIG. 4.

In this example User1 (U1) is calling his acquaintance Jo by saying "Aggregator, call Jo". Aggregator1 (A1) identifies the "Call" keyword and verifies User1's identity.

Aggregator1 connects to Smartphone1 (S1). The connection complies with Bluetooth protocols. Calling a specific contact (Jo in this example) is done through commercial $3^{rd}$ party smartphone applications. At the same time Aggregator1 verbally controls Echo1 (E1) to establish a Bluetooth connection between the two apparatuses.

A call is conducted. User1 voice is captured by Aggregator1's microphone array. Called party voice is played through E1.

User1 can initiate call end by issuing the verbal command "Aggregator disconnect". Alternatively call end is initiated by the called party. In either case, Echo's link is disconnected once A1 plays the relevant verbal command to E1.

The next Use Case 300 in FIG. 4 shows variations from the previous process if S1 receives a call while the previous call is still active ("Call waiting" scenario). If this feature is enabled in S1, then the phone adds a "call wait" signal to the audio and User1 hears it through E1's speaker. If User1 decides to switch to the new call he instructs A1 by saying "Aggregator, answer call". Keywords and User are identified by A1 which then instructs S1 to switch calls.

The following Use Case details variations from the previous process when the speaker is not part of an "Echo like" verbally controlled system. In this example, a dedicated Bluetooth controlled speaker is used. The variations result from a data based control interface which replaces Echo like verbal control system.

FIG. 5 illustrates TTS use case 500.

In this use case, User1 (U1) instructs Aggregator1 (A1) to play Smartphone1's (S1) notifications as they are received ("Aggregator, play notifications"). Keywords and User are identified by A1.

A1 instructs S1 to send notifications by Bluetooth. Notifications are transformed into speech in the smartphone by $3^{rd}$ party applications. The user is free to choose and set-up an application according to his personal preferences.

Each time a notification is sent from S1 to A1, a verbal command procedure connects E1 to A1 as described in previous use cases.

Notification is played on E1.

A disconnect procedure is invoked, as described in previous use cases.

The next Use Case in FIG. 5 shows variations from the previous process when the speaker is not part of an "Echo like" system (verbally controlled $3^{rd}$ party system). In this example, a dedicated Bluetooth controlled speaker is used. The variations result from a data based control interface which replaces Echo's verbal control mechanism.

Synchronizing aggregators use case 600 is shown in FIG. 6.

Synchronization of Aggregators located in the same household or office is required when these Aggregators have a common user base. Some of the resulting potential benefits are:

When more than a single aggregator intercepts user voice, only the one with the highest signal quality will respond.

Aggregator's preferences and biometric signatures (for keywords and user identification) need only to be entered once by the user.

User can control operation of all aggregators in a household or an office. This can be used for example for muting all aggregators at night.

Synchronized data is transferred to and from Aggregators over Wi-Fi.

Several examples of synchronized operation are provided in sections 3a and 3b in the table of FIG. 6:

Section 3a details audio and data flows when User1 instructs Aggregator1 to handle all calls originating from his smartphone (S1). This instruction implies that other Aggregators are muted with respect to S1. To implement the instruction, it must be shared among all Aggregators.

Section 3b details audio and data flows when User1 instructs to mute all Aggregators in a household or an office.

When a user is in a microphone coverage area of more than a single Aggregator his voice may be intercepted by several devices. The relevant signal to noise ratio along with user identification is shared by all Aggregators. The aggregator that provides the best signal quality handles communication with the user.

Digital Assistant Remote Control

FIG. 7 use case 700. User1 (U1) who is located outside the Aggregator's (A1) wireless coverage, plans to operate his verbally controlled digital assistant (E1). U1 launches a smartphone application that establishes an internet connection with A1, which is physically adjacent to the E1.

Figure 8:
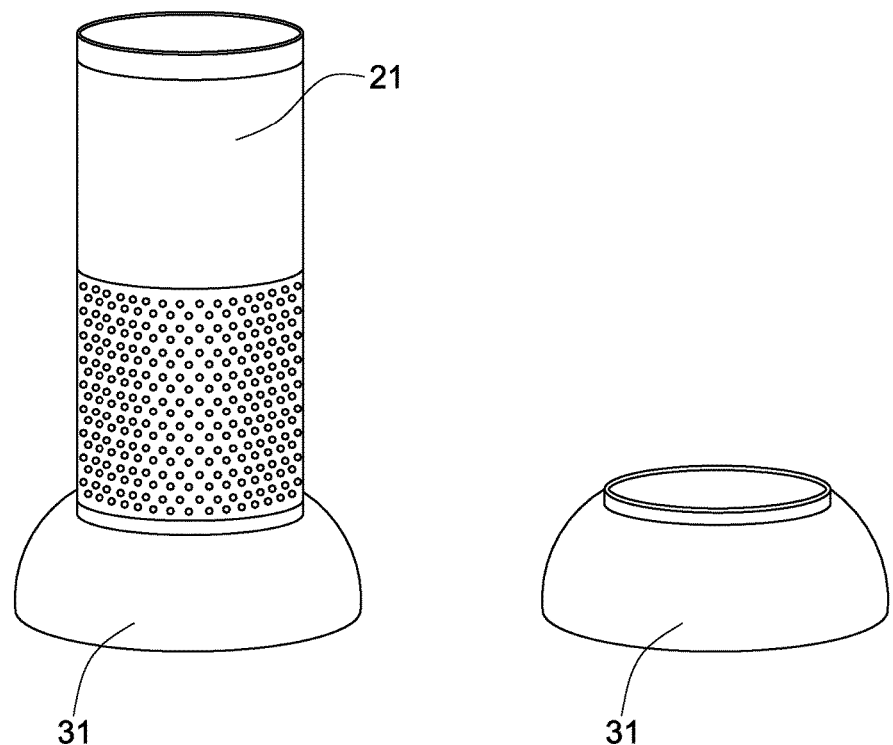
FIG. 8 illustrates an apparatus.

FIG. 8 illustrates an apparatus 31 that has a cradle shaped housing that encloses modules 101-109 (not shown) and is used as a base to a voice-controlled digital assistant.

Figure 9:
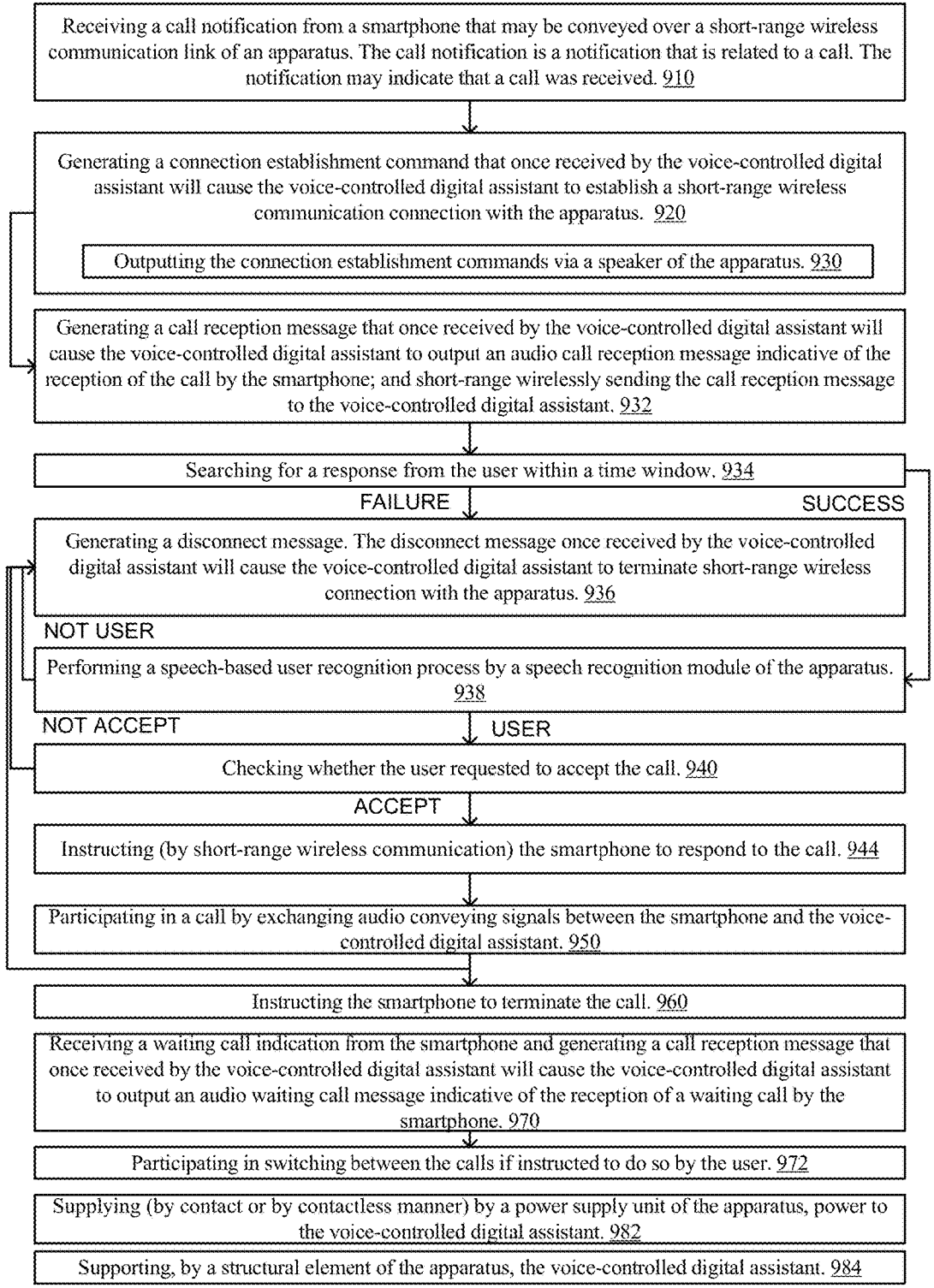
FIG. 9 illustrates a method.

FIG. 9 illustrates an example of method 900.

Method 900 may include:

a. Step 910 of receiving a call notification from a smartphone that may be conveyed over a short-range wireless communication link of an apparatus. The call notification is a notification that is related to a call. The notification may indicate that a call was received.

b. Step 920 of generating a connection establishment command that once received by the voice-controlled digital assistant will cause the voice-controlled digital assistant to establish a short-range wireless communication connection with the apparatus. The connection between the apparatus and the voice-controlled digital assistant may be terminated at the end of the call—and thus a new connection should be established. Alternatively—the connection may be maintained regardless a reception or termination of a call—and in this case step 920 does not need to be repeated whenever a call is received by the smartphone.

c. Step 930 of outputting the connection establishment commands via a speaker of the apparatus. Step 930 may be included in step 930.

d. Step 932 of generating a call reception message that once received by the voice-controlled digital assistant will cause the voice-controlled digital assistant to output an audio call reception message indicative of the reception of the call by the smartphone; and short-range wirelessly sending the call reception message to the voice-controlled digital assistant. The call reception message may include an identification of a user associated with the smartphone.

e. Step 934 of searching for a response from the user within a time window.

f. If failing to receive a response during a time window then step 934 is followed by step 936 of generating a disconnect message when failing to detect a response from the user during the time window. The disconnect message once received by the voice-controlled digital assistant will cause the voice-controlled digital assistant to terminate short-range wireless connection with the apparatus.

g. If receiving a response from a user then step 934 is followed by step 938. Step 938 includes performing a speech-based user recognition process by a speech recognition module of the apparatus.

h. If the speech-based user recognition process fails then jumping to step 936.

i. If the speech-based user recognition process succeeds then step 938 is followed by checking whether the user requested to accept the call. If so—step 938 is followed by step 940 of instructing (by short-range wireless communication) the smartphone to respond to the call.

j. If the request was to transfer the call to another apparatus or not to accept the call the apparatus may respond accordingly. For example—a request to reject the call may be followed by rejecting the call—instructing the smartphone not to accept the call—and jumping to step 936. If the request was to transfer the management of the call to another apparatus—then requesting from the other apparatus to take over and jumping to step 936.

k. If more than a single apparatus received the request of the user than one of the apparatuses may be selected to take over the call and other apparatuses may be prevented from responding. The selection may be predefined, determined by the apparatuses (for example—based on strength of the receiving of the user command), and the like.

l. Step 950 of participating in a call by exchanging audio conveying signals between the smartphone and the voice-controlled digital assistant.

m. Step 960 of instructing the smartphone to terminate the call. Step 960 may be triggered by detecting a user generated request to terminate the call or detecting a caller generated request to terminate the call. Step 960 may also include generating a disconnect message in response to the detection of the user generated request to terminate the call; wherein the disconnect message once received by the voice-controlled digital assistant will cause the voice-controlled digital assistant to terminate short-range wireless connection with the apparatus.

The speech-based user recognition process may be performed on the user voice command or on a processed user voice command, the processed user voice command may be generated by applying a far field process for improving far field speech intelligibility.

The call notification may be a call reception notification regarding of a reception of a call by the smartphone.

Method 900 may also include step 970 of receiving (during the execution of step 950) a waiting call indication from the smartphone and generating, in response to the waiting call indication, a waiting call message that once received by the voice-controlled digital assistant will cause the voice-controlled digital assistant to output an audio waiting call message indicative of the reception of a waiting call by the smartphone.

Another scenario is having a sound inserted into the audio stream either directly by the smartphone or by the apparatus. In such a case there is no need for the digital assistant to generate any specific message. It just continues to output the audio stream it receives.

Step 970 may be followed by step 972 of participating in switching the call (instructing the smartphone to perform the switching) if instructed to do so by the user.

Method 900 may include detecting a request from the user to mute calls; and preventing sending notifications about incoming calls, following the request from the user.

Method 900 may include step 982 of supplying (by contact or by contactless manner) by a power supply unit of the apparatus, power to the voice-controlled digital assistant.

Method 900 may include step 984 of supporting, by a structural element of the apparatus, the voice-controlled digital assistant.

The structural element may be a cradle having an upper part that may be shaped and sized to support the voice-controlled digital assistant.

Figure 10:
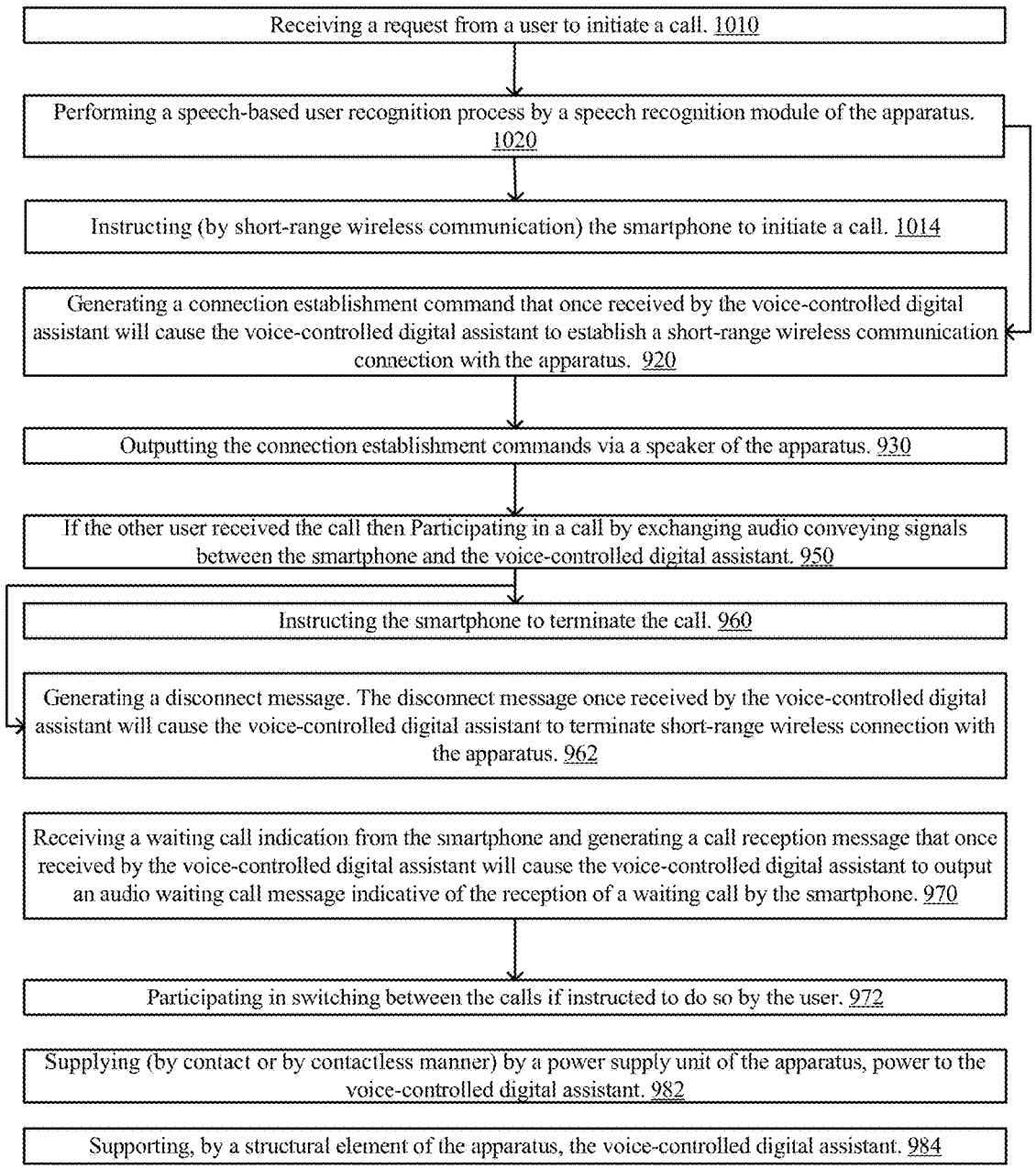
FIG. 10 illustrates a method.

FIG. 10 illustrates an example of method 1000.

Method 1000 may include:
a. Step 1010 of receiving a request from a user to initiate a call.
b. Step 1020 of performing a speech-based user recognition process by a speech recognition module of the apparatus.
c. If the speech-based user recognition process fails then the method ends.
d. If the speech-based user recognition process succeeds then step 1020 is followed by steps 1014 and 920.
e. Step 1014 includes instructing the smartphone to answer the call.
f. Step 920 includes generating a connection establishment command that once received by the voice-controlled digital assistant will cause the voice-controlled digital assistant to establish a short-range wireless communication connection with the apparatus. The connection between the apparatus and the voice-controlled digital assistant may be terminated at the end of the call—and thus a new connection should be established whenever a call is received by the smartphone.
g. Alternatively—the connection may be maintained regardless a reception or termination of a call—and in this case step 920 does not need to be repeated whenever a call is received by the smartphone.
h. Step 930 of outputting the connection establishment commands via a speaker of the apparatus. Alternatively, sending the connection establishment commands via short-range wireless communications connection.
i. Step 950 of participating in a call by exchanging audio conveying signals between the smartphone and the voice-controlled digital assistant.
j. Step 960 of instructing the smartphone to terminate the call. Step 960 may be triggered by detecting a user generated request to terminate the call or detecting a called party generated request to terminate the call.
k. Step 962 of generating a disconnect message in response to the detection of the request to terminate the call; wherein the disconnect message once received by the voice-controlled digital assistant will cause the voice-controlled digital assistant to terminate short-range wireless connection with the apparatus.

Method 1000 may also include step 970 of receiving (during the execution of step 950) a waiting call indication from the smartphone and generating, in response to the waiting call indication, a waiting call message that once received by the voice-controlled digital assistant will cause the voice-controlled digital assistant to output an audio waiting call message indicative of the reception of a waiting call by the smartphone.

Step 970 may be followed by step 972 of participating in switching the call (instructing the smartphone to perform the switching) if instructed to do so by the user.

Method 1000 may include detecting a request from the user to mute calls; and preventing sending notifications about incoming calls, following the request from the user.

Method 1000 may include step 982 of supplying (by contact or by contactless manner) by a power supply unit of the apparatus, power to the voice-controlled digital assistant.

Method 1000 may include step 984 of supporting, by a structural element of the apparatus, the voice-controlled digital assistant.

The structural element may be a cradle having an upper part that may be shaped and sized to support the voice-controlled digital assistant.

Figure 11:
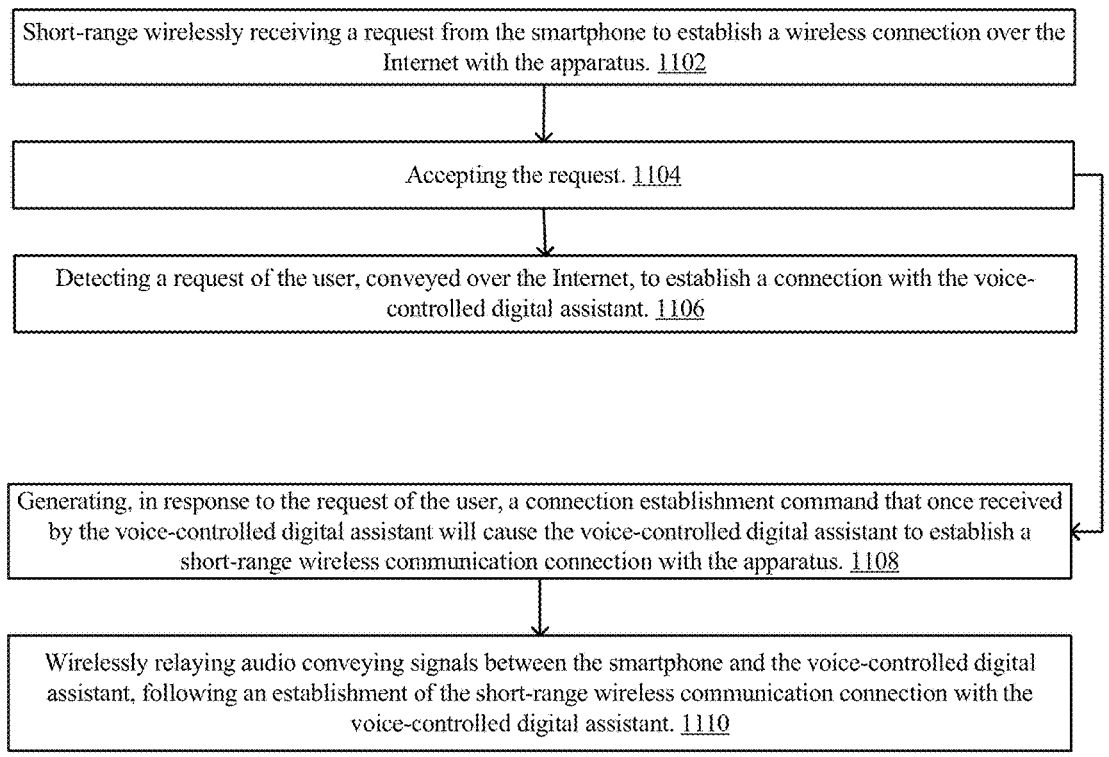
FIG. 11 illustrates a method.

FIG. 11 illustrates method 1100.

Method 1100 may include the following steps:
a. Step 1102 of short-range wirelessly receiving a request from the smartphone to establish a wireless connection over the Internet with the apparatus.
b. Step 1104 of accepting the request.
c. Step 1106 of detecting a request of the user, conveyed over the Internet, to establish a connection with the voice-controlled digital assistant.
d. Step 1108 of generating, in response to the request of the user, a connection establishment command that once received by the voice-controlled digital assistant will cause the voice-controlled digital assistant to establish a short-range wireless communication connection with the apparatus.
e. Step 1110 of wirelessly relaying audio conveying signals between the smartphone and the voice-controlled digital assistant, following an establishment of the short-range wireless communication connection with the voice-controlled digital assistant.

There may be provided an apparatus and a method for smartphone aggregation.

The apparatus may be configured to:
a. Capture and process user voice, whereas, the apparatus's audio capture module, may receive and enhance user voice. This may be executed by an array of one or more microphones and by far field processing hardware and software.

b. Process audio by a speech recognition module and identify keywords that control apparatus operation.
c. Aggregate, for one or more smartphones, smartphone control, data, and audio.
d. Monitor and control smartphones' activity.
e. Send user audio to the smartphone via a wireless link.
f. Wirelessly receive smartphone audio.
g. Playing notifications and smartphone audio on third party system's speaker.
h. Control the third party system by voice commands and/or by commands that are conveyed over information (not audio) conveying links. In non-audio conveying links the carrier is not an audio carrier signal but rather another carrier—such as a radio frequency carrier, an optical carrier, an infrared carrier, and the like.
i. Wirelessly send voice and notifications to third party system to be played by the third party speaker.
j. Receive web based software downloads and update apparatus software.
k. Download user preferences and databases from dedicated smartphone application.
l. Sharing, with one or more other apparatuses a same wireless coverage area and synchronize real-time and off-line data.
m. Sending audio by the apparatus to be played by a wireless speaker.
n. Controlling a wireless speaker by apparatus generated voice commands or data commands or a combination of both.
o. Playing audio on a speaker of the apparatus.
p. Performing command and control operations internally by the apparatus.
q. Control a third party system by data commands generated by the apparatus.
r. Control a third party system by a combination of voice and data commands.
s. Identify a user's voice and granting apparatus access.
t. Send audio to be played by a wireless speaker.
u. Controlling a wireless speaker by either voice commands generated by the apparatus or data commands sent by the apparatus.
v. Playing audio on a speaker which is part of the apparatus.
w. Generate speaker command and control internally by the apparatus.
x. Remote controlling a third party system, while none or some smartphones located within the apparatus's wireless coverage area.
y. Remote controlling a third party system, while none or some users are located within the apparatus's audio capture coverage area.
z. Process user voice that originates from a dedicated smartphone application.
aa. Identify users and granting apparatus access.
bb. Play by an apparatus speaker user audio to $3^{rd}$ party system.
cc. Send captured third party system audio to user.

The terms "including", "comprising", "having", "consisting" and "consisting essentially of" are used in an interchangeable manner. For example—any method may include at least the steps included in the figures and/or in the specification, only the steps included in the figures and/or the specification. The same applies to the pool cleaning robot and the mobile computer.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

Any system, apparatus or device referred to this patent application includes at least one hardware component.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A method, comprising:
   receiving, by an apparatus, at least one out of (i) a call notification from a smartphone that is conveyed over a short-range wireless communication link of the apparatus, and (ii) a user voice command for initiating a call by the smartphone, the user voice command is detected by a microphone array of the apparatus;
   generating, a connection establishment command that once received by a voice-controlled digital assistant will cause the voice-controlled digital assistant to establish a short-range wireless communication connection with the apparatus; wherein the voice controlled digital assistant does not belong to the apparatus;
   outputting the connection establishment commands via a speaker of the apparatus;
   performing a speech-based user recognition process by a speech recognition module of the apparatus;
   following a successful speech-based user recognition process and a successful establishment of the short-range wireless communication connection with the voice-controlled digital assistant, participating in a call by exchanging audio conveying signals between the smartphone and the voice-controlled digital assistant.

2. The method according to claim 1 wherein the performing of the speech-based user recognition process is performed on the user voice command.

3. The method according to claim 1 wherein the performing of the speech-based user recognition process is performed on a processed user voice command, the processed user voice command is generated by applying a far field process for improving far field speech intelligibility.

4. The method according to claim 1, wherein the call notification is a call reception notification regarding of a reception of a call by the smartphone.

5. The method according to claim 4, comprising generating, by the apparatus, a call reception message that once received by the voice-controlled digital assistant will cause the voice-controlled digital assistant to output an audio call reception message indicative of the reception of the call by the smartphone; and short-range wirelessly sending the call reception message from the apparatus to the voice-controlled digital assistant.

6. The method according to claim 5 wherein the call reception message comprises an identification of a user associated with the smartphone.

7. The method according to claim 5 comprises performing the speech-based user recognition process within a time window that starts at when short-range wirelessly sending the call reception message.

8. The method according to claim 7 comprising generating a disconnect message when failing to detect a response from the user during the time window; wherein the disconnect message once received by the voice-controlled digital assistant will cause the voice-controlled digital assistant to terminate short-range wireless connection with the apparatus.

9. The method according to claim 4 comprising detecting a user generated request to terminate the call; and generating a disconnect message in response to the detection of the user generated request to terminate the call; wherein the disconnect message once received by the voice-controlled digital assistant will cause the voice-controlled digital assistant to terminate short-range wireless connection with the apparatus.

10. The method according to claim 4 comprising detecting a caller generated request to terminate the call; and generating a disconnect message in response to the detection of the caller generated request to terminate the call; wherein the disconnect message once received by the voice-controlled digital assistant will cause the voice-controlled digital assistant to terminate short-range wireless connection with the apparatus.

11. The method according to claim 4 comprising short-range wirelessly receiving a waiting call indication from the smartphone; and generating in response to the waiting call indication, a call reception message that once received by the voice-controlled digital assistant will cause the voice-controlled digital assistant to output an audio waiting call message indicative of the reception of a waiting call by the smartphone.

12. The method according to claim 1, comprising detecting a request from the user to transfer a call to another apparatus; and short-range wirelessly communicating the request to the other apparatus and instructing the apparatus to disconnect.

13. The method according to claim 1, comprising detecting a request from the user to mute calls; and preventing sending notifications about incoming calls, following the request from the user.

14. The method according to claim 1, comprising participating in a selection process for selecting an apparatus, out of a group of apparatus, that will respond to a user command; wherein the group comprises the apparatus and at least one other apparatus.

15. The method according to claim 14, wherein the selection process is based on strength of reception of the user command by the members of the group.

16. The method according to claim 1, comprising:
short-range wirelessly receiving a request from the smartphone to establish a wireless connection over the Internet with the apparatus;
accepting the request;
detecting a request of the user, conveyed over the Internet, to establish a connection with the voice-controlled digital assistant;
generating, in response to the request of the user, a connection establishment command that once received by the voice-controlled digital assistant will cause the voice-controlled digital assistant to establish a short-range wireless communication connection with the apparatus; and
wirelessly relaying audio conveying signals between the smartphone and the voice-controlled digital assistant, following an establishment of the short-range wireless communication connection with the voice-controlled digital assistant.

17. The method according to claim 1, comprising short-range wirelessly communicating with the smartphone using a first short-range wireless communication protocol and short-range wirelessly communicating with the voice-controlled digital assistant using a second short-range wireless communication protocol, wherein the first and second short-range wireless communication protocols are associated with different power consumption of the apparatus.

18. The method according to claim 17 wherein the first and second short-range wireless communication protocols are different classes of BLUETOOTH.

19. The method according to claim 1, comprising short-range wirelessly communicating using at least one out of BLUETOOTH and WI-FI.

20. The method according to claim 1, comprising supplying, by a power supply unit, power to the voice-controlled digital assistant.

21. The method according to claim 1, comprising wirelessly supplying, by a power supply unit, power to the voice-controlled digital assistant.

22. The method according to claim 1, comprising supporting, by a structural element of the apparatus, the voice-controlled digital assistant.

23. The method according to claim 22, wherein the structural element is a cradle having an upper part that is shaped and sized to support the voice-controlled digital assistant.

24. A non-transitory computer readable medium that stores instructions that once executed by an apparatus will cause the apparatus to:
receive at least one out of (i) a call notification from a smartphone that is conveyed over a short-range wireless communication link of an apparatus, and (ii) a user voice command for initiating a call by the smartphone, the user voice command is detected by a microphone array of the apparatus;
generate, a connection establishment command that once received by a voice-controlled digital assistant will cause the voice-controlled digital assistant to establish a short-range wireless communication connection with the apparatus; wherein the voice controlled digital assistant does not belong to the apparatus;
output the connection establishment commands; via a speaker of the apparatus;
perform a speech-based user recognition process by a speech recognition module of the apparatus; and
following a successful speech-based user recognition process and a successful establishment of the short-range wireless communication connection with the voice-controlled digital assistant, participate in a call by exchanging audio conveying signals between the smartphone and the voice-controlled digital assistant.

* * * * *